United States Patent
Ashley et al.

(10) Patent No.: US 9,472,232 B2
(45) Date of Patent: Oct. 18, 2016

(54) DUAL-SIDED OPTICAL DISCS WITH NORMALLY ORIENTED AND INVERTED TEXT PATTERNS

(71) Applicants: Jon Ashley, Terre Haute, IN (US); Michael Mitchell, Terre Haute, IN (US)

(72) Inventors: Jon Ashley, Terre Haute, IN (US); Michael Mitchell, Terre Haute, IN (US)

(73) Assignee: SONY DADC US Inc., Terre Haute, IN (US)

(*) Notice: Subject to any disclaimer, the term of this patent is extended or adjusted under 35 U.S.C. 154(b) by 25 days.

(21) Appl. No.: 14/461,898

(22) Filed: Aug. 18, 2014

(65) Prior Publication Data
US 2014/0355406 A1 Dec. 4, 2014

Related U.S. Application Data

(63) Continuation of application No. 13/033,168, filed on Feb. 23, 2011, now Pat. No. 8,850,981.

(51) Int. Cl.
| | |
|---|---|
| *B41F 33/00* | (2006.01) |
| *G11B 7/24094* | (2013.01) |
| *G11B 7/007* | (2006.01) |
| *G11B 23/40* | (2006.01) |
| *B41M 3/00* | (2006.01) |
| *G11B 7/24041* | (2013.01) |

(52) U.S. Cl.
CPC .......... *G11B 7/24094* (2013.01); *B41M 3/008* (2013.01); *G11B 7/00736* (2013.01); *G11B 23/40* (2013.01); *G11B 7/24041* (2013.01)

(58) Field of Classification Search
CPC ............... B41F 35/00; G11B 7/24094; G11B 7/00736; G11B 23/40; G11B 3/008
See application file for complete search history.

(56) References Cited

U.S. PATENT DOCUMENTS

| | | | |
|---|---|---|---|
| 4,726,006 A | 2/1988 | Benne | |
| 5,982,737 A | 11/1999 | Takagishi et al. | |
| 6,538,983 B1 | 3/2003 | Satoh | |
| 7,359,309 B2 | 4/2008 | Oishi | |
| 2004/0264361 A1 | 12/2004 | Kondo | |
| 2006/0140096 A1* | 6/2006 | Tabata et al. | 369/59.11 |

FOREIGN PATENT DOCUMENTS

JP  61003382  1/1986

OTHER PUBLICATIONS http://marvin.mrtoads.com/disc_template.html; Humphrey, Marvin; 2000; 6 pages.

* cited by examiner

*Primary Examiner* — Matthew G Marini
(74) *Attorney, Agent, or Firm* — Trellis IP Law Group, PC (57) ABSTRACT

Disclosed is an optical disc with a first area to store data for playback and that is reflective or opaque to visible light, and a second area that is transparent to visible light and includes first and second concentric rings. In one embodiment, a method of printing information on the optical disc includes: printing an inverse first text pattern in the first ring during a first printing on a first side, where the first text pattern is formed in reverse as viewed from the first side; printing a second text pattern in the second ring during a second printing on the first side, where the second text pattern is correctly visible from the first side; and printing, during the second printing, a first solid pattern to overlay at least a portion of the first text pattern, where the first text pattern is correctly visible as viewed from a second side.

5 Claims, 5 Drawing Sheets

DUAL-SIDED OPTICAL DISCS WITH NORMALLY ORIENTED AND INVERTED TEXT PATTERNS

CROSS REFERENCES TO RELATED APPLICATIONS

This application is a continuation of the following application, U.S. patent application Ser. No. 13/033,168, entitled SINGLE-SIDED PRINTING PROVIDING DUAL-SIDED READING OF PRINT ON OPTICAL DISCS, filed on Feb. 23, 2011 which is hereby incorporated by reference, as if set forth in full in this specification.

BACKGROUND

In dual-sided discs, data for playback is stored on each side of the optical disc, and this takes up the vast majority of the disc area. Typically, only a relatively small area near the center of the disc is available for printing information (e.g., playback orientation, content information, etc.) about the disc. In addition, hybrid dual-sided discs contain different types or formats of media content, with a different such format on each side of the optical disc. Because the area available for printing information is typically transparent, such information is conventionally either printed on each side of the optical disc, or is not correctly visible as viewed from each side of the disc.

SUMMARY

An optical disc can include a first area to store data for playback and that is reflective or opaque to visible light, and a second area that is transparent to visible light and includes first and second concentric rings.

In one embodiment, a method of printing information on a dual-sided optical disc can include: printing an inverse of a first text pattern in the first ring during a first printing on a first side of the optical disc, where the first text pattern is formed in reverse as viewed from the first side of the optical disc; printing a second text pattern in the second ring during a second printing on the first side of the optical disc, where the second text pattern is correctly visible as viewed from the first side of the optical disc; and printing, during the second printing on the first side of the optical disc, a first solid pattern to overlay at least a portion of the first text pattern, where the first text pattern is correctly visible as viewed from a second side of the optical disc, and where letters in the correctly visible first text pattern have a same color as the first solid pattern.

In one embodiment, a computer-readable storage medium having software encoded thereon for execution by one or more processors, can be operable when executed to perform such a method of printing information on a dual-sided optical disc.

In one embodiment, an optical disc can include printed information on a first side of the optical disc, where the second area includes: a first ring having an inverse of a first text pattern, and a first solid pattern that overlays at least a portion of the first text pattern, where the first text pattern is correctly visible as viewed from a second side of the optical disc, where letters in the correctly visible first text pattern have a same color as the first solid pattern, and where the inverse of the first text pattern is in a first color, and the first solid pattern is in a second color; and a second ring concentric with the first ring, where the second ring comprises a second text pattern that is correctly visible as viewed from the first side of the optical disc, where the second text pattern is in the second color.

A further understanding of the nature and the advantages of particular embodiments disclosed herein may be realized by reference of the remaining portions of the specification and the attached drawings.

DETAILED DESCRIPTION OF EMBODIMENTS

A dual-sided disc is a disc that is playable from both sides. For example, a dual-sided optical disc can include media content data that is playable or readable when oriented on either side by using a laser. The printable area, such as for conveying information about the disc, on a dual-sided disc may be limited to a relatively small area near the center of the disc. A hybrid dual-sided disc is one that has different types or formats of media content on the same disc. For example, a dual-sided hybrid optical disc can include a digital video disc (DVD) data format on one side of the disc, and a Blu-ray disc (BD) data format on the other side of the disc.

Figure 1:
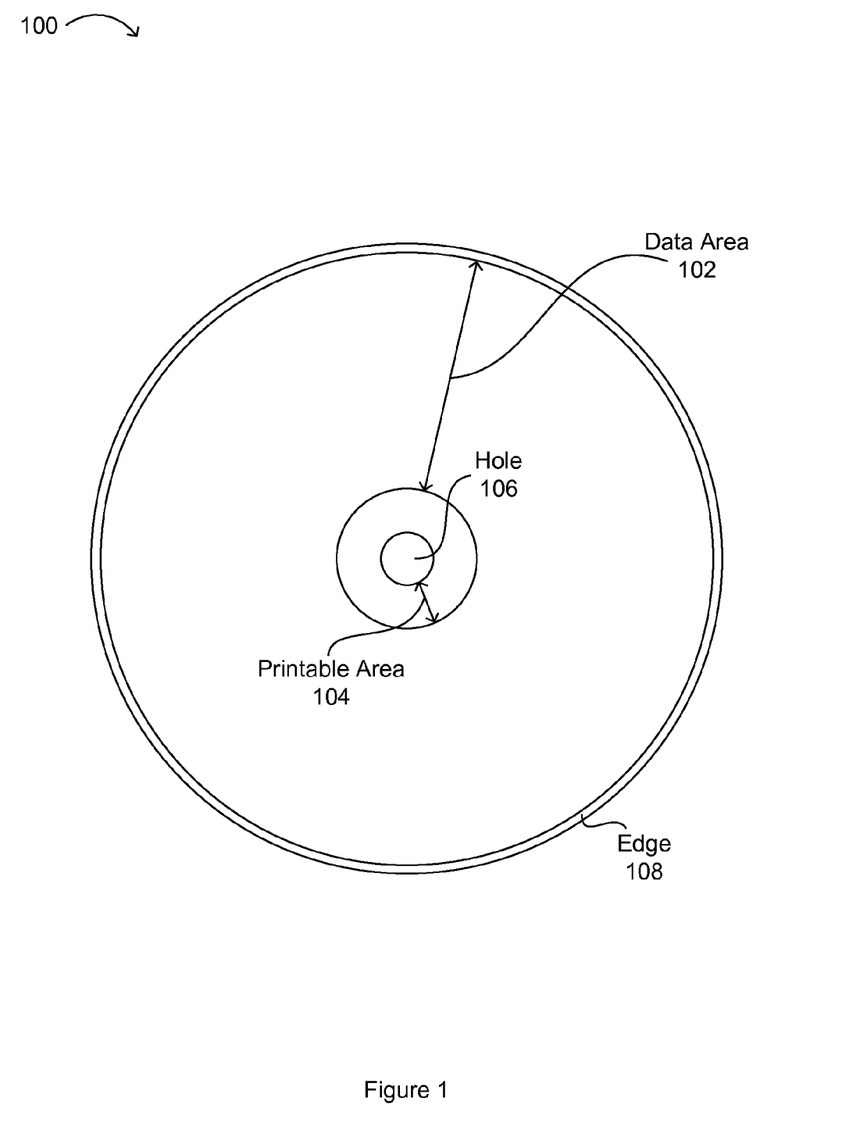
FIG. 1 depicts an example media disc with a data area and a printing area.

In FIG. 1, shown is an example media disc 100 with a data area and a printing area. Data area 102 can include the media content for that disc side, and may extend to edge 108 of the disc. Data area 102 is used for playback of the media content data, and allows for the disc player's laser to pass over for reading the data. Thus, data area 102 is reflective or opaque to visible light. Hole 106 in the center of the disc can be used to mount the disk on a disc player. Printable area 104 can be a relatively small area (e.g., between about 16 mm and 45 mm in diameter), and may be used for content identification (e.g., a movie title, audio identifiers, etc.), and for showing proper playback orientation (e.g., which side is up in the disc player for a particular format).

In some approaches for dual-sided discs, both sides of printable area 104 can be printed. In such an approach, the disc is flipped over during the printing process in order to print information on each side of printable area 104. This is one way to provide unique information for each side of a dual-sided hybrid optical disc. However, in order to avoid the difficulty and cost associated with flipping the disc during the printing process, some approaches instead print only a bare minimum of information on a single side of the disc. This also can result in a user having to flip the disc over to determine the proper playback orientation for a hybrid disc.

Dual-sided discs can employ a variety of media content formats. For example, DVD and Blu-ray media formats are common. The DVD specification allows a disc to contain one or two data layers on both sides of the disc (e.g., DVD-10, DVD-14, DVD-18, etc.). Further, hybrid discs can be formed with a DVD side (e.g., one or two playable layers), and a Blu-ray side (e.g., one or two playable layers). Because these basic formats differ from side to side, it is important to show proper disc orientation for the end user on each disc side for hardware compatibility purposes.

Particular embodiments employ a printing approach that allows an inner hub or printable area 104 to convey content information and proper playback orientation that is unique to and suitably readable for each disc side. Further, particular embodiments may print only on one side of the optical disc. Thus, complexity and cost can be reduced by not having to flip the disc over during the printing process. Further, a less critical side (e.g., DVD side) can be chosen for the print side to alleviate quality concerns (e.g., for the Blu-ray side) due to information densities and playback margins.

Particular embodiments allow for viewing of one text pattern on a print side of the optical disc, and a different text pattern on the non-print side of the optical disc. The "print" side of the disc may be the side on which content and playback orientation information is printed during a printing process. The printing process can include any number of printing or print layers (e.g., one, two, three, etc.) on the print side of the disc. For example, information can be printed on a DVD side of a dual-sided hybrid optical disc, and information unique to the DVD side can be seen on the DVD side, while different information unique to the Blu-ray side can be seen on the Blu-ray side of the disc.

Thus, a same character or text pattern may not be viewable from each side of the disc, even though printable area 104 can be initially transparent. Rather, different text patterns may be viewable from different disc sides. Accordingly, the DVD side content and playback orientation information may only be viewable and correctly visible from the DVD side, while the Blu-ray content and playback orientation information may only be viewable and correctly visible from the Blu-ray side. Example approaches for accomplishing this unique side-dependent information while printing on only one side of the optical disc to provide different printed information readable by viewing from each side will be discussed in more detail below.

Figure 2:
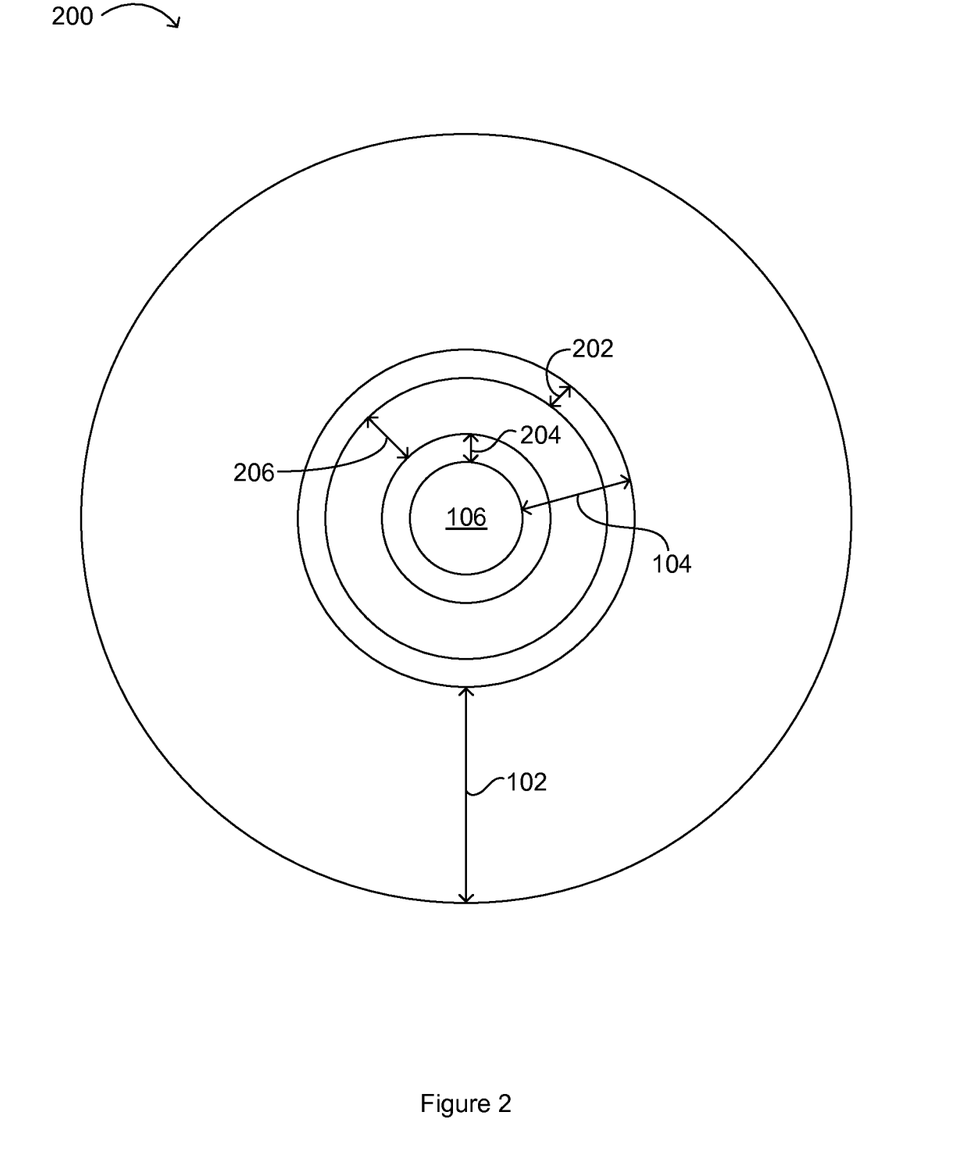
FIG. 2 depicts an example printing area within a disc.

In FIG. 2, shown is an example 200 of a more detailed printing area within a disc. Printable area 104 can include an inner ring 204 and an outer ring 202, which can be designated as regions on which ink will be deposited during a printing process. Other suitable areas or regions can also be so designated in particular embodiments. In this example, concentric rings 202 and 204 can be spaced apart by area 206. Thus, area 206 may not be printed upon during the printing process. In particular embodiments, concentric rings 202 and 204 can be designated for printing content information, as well as information about proper playback orientation. Of course, any suitable information can be printed in these designated regions. Area 206, which may not be designated as a printing region, can remain substantially transparent.

Any suitable graphics file format can be used to define printing regions, as well as patterns for printing. For example, template files and/or text pattern files or characters can be utilized to form a mask or other designator to control areas in which ink is to be printed on printable area 104. Graphics tools (e.g., Illustrator, Visio, Adobe Photoshop, etc.) can be used to specify which characters are to be printed in which locations (e.g., concentric rings 202 and 204, etc.) on the optical disc. The mask or other print designator can also use various registration marks in the file itself and/or on the disc itself to orient the printed graphics versus printable area 104.

Outer ring 202 may be inside a minor band, which may be an area of high reflectivity on an inside edge portion of data area 102. In certain embodiments, printable area 104, and in particular outer ring 202 may be just inside this minor band. Alternatively, outer ring 202 can be over the location of the minor band, such as when the mirror band is less important relative to the content in the printable area on the print side of the disc. In this case, it may be acceptable to print content or playback orientation information for the print side of the disc at least partially over this mirror band. In other cases, outer ring 202 may be inside the mirror band, with a predetermined spacing between outer ring 202 and the minor band.

Some discs also include a stacking ring that is not part of the printable area. This ring is a depression on one side (e.g., a top side) of a disc, which corresponds to a ridge on the other side (e.g., a bottom side). Such a stacking ring is used to facilitate the stacking of multiple discs, and the location of the stacking ring varies from manufacturer to manufacturer. Thus, if a stacking ring is found within printable area 104, this ring can also be excluded from the actual area to be printed. For example, such a stacking ring could be found in area 206, which is between concentric rings 202 and 204. In the particular examples herein, printing can be substantially confined to the concentric rings 202 and 204, and area 206 can remain substantially transparent.

Figure 6:
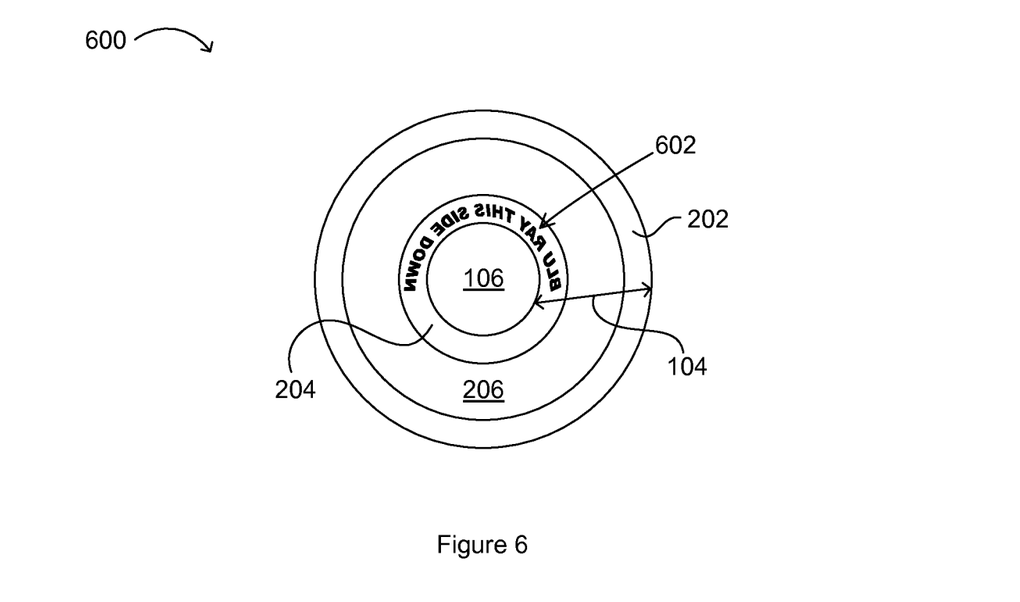
FIG. 6 depicts an example first printing on the DVD side of an example dual-sided disc.

In particular embodiments, printing can occur on only one side (a "print side") of printable area 104. For example, ring 204 can be printed with an inverse of a first text pattern, where the first text pattern is printed in reverse. An example of reverse printing of a text pattern is shown in FIG. 6. In addition, "inverse" can be an absence of ink defining the letters or characters, whereby ink is used to outline each letter so that the letters themselves are transparent. Further, a "text pattern" can be any suitable alphanumeric or other type of character that conveys a message, alone or in a string. For example, any numbers, letters, combinations thereof, as well as different languages and even other characters that do not represent letters or numbers, can be used as the text patterns described herein.

In addition, a first solid pattern that overlays at least a portion of the first text pattern can be printed in ring 204 during a second printing. This first solid pattern can form a background that fills in the text pattern left behind from the first printing in ring 204. As such, colors used in the first printing and the second printing may be contrasting colors, such as black and white. However, the colors used need not be as fully contrasting as black and white, but rather can be any color combinations that contrast enough to allow for distinguishing characters when one color is used as a background for the other color.

The first text pattern, while being printed on a first side of the disc in reverse, may be correctly visible as viewed from a second side (a "non-print" side) of the disc. "Correctly visible" can mean forward or proper facing text, or otherwise correctly readable text, such as text that is not reflected or reversed as viewed. In addition, letters in the correctly visible first text pattern may have a same color (e.g., black) as the first solid pattern. For example, the inverse of the first text pattern may be printed in a white color, and the first solid pattern can be printed in a black color.

Ring 202 can be printed with a second text pattern that is correctly visible or readable as viewed from the first side (the print side) of the optical disc. This second text pattern may also be in the same color as the first solid pattern, as part of the second printing. Thus, a first printing can include the first text pattern (e.g., in ring 204), and the second printing can include the first solid pattern (e.g., in ring 204) and the second text pattern (e.g., in ring 202). Further, the first printing may also include a second solid pattern (e.g., in ring 202).

Figure 3:
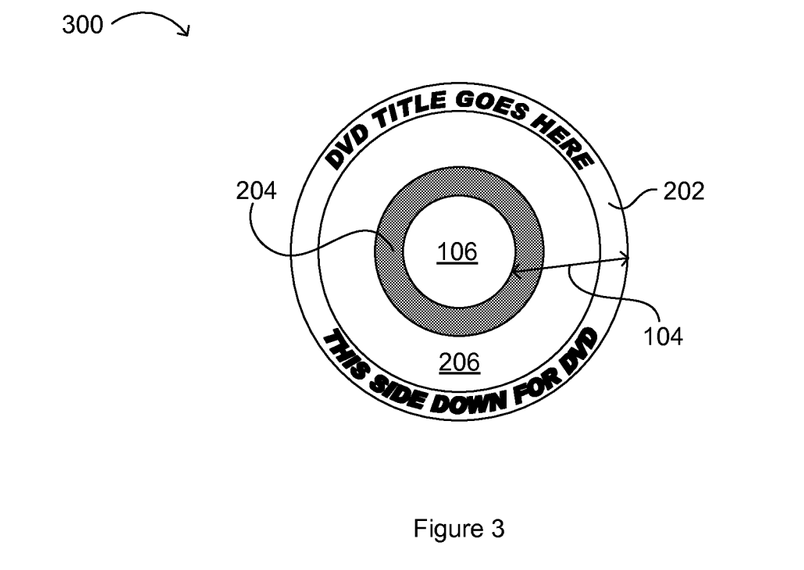
FIG. 3 depicts an example DVD side printing area of a dual-sided disc.

In FIG. 3, shown is an example 300 DVD side printing area of a dual-sided disc. This figure represents a view of printable area 104 as viewed from a first or print (e.g., DVD) side of the disc. In this example, ring 202 can include correctly visible text patterns to indicate content information (e.g., "DVD TITLE GOES HERE") and playback orientation information (e.g., "THIS SIDE DOWN FOR DVD"). Ring 204 from the view of the DVD side of the disc appears as a solid ring (e.g., in color black).

Figure 4:
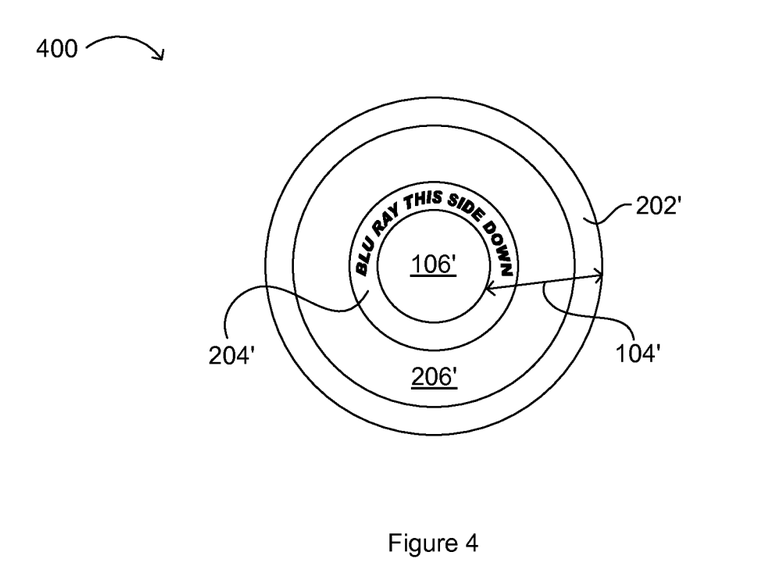
FIG. 4 depicts an example BD side printing area of the dual-sided disc of FIG. 3.

In FIG. 4, shown is an example 400 BD side printing area of the dual-sided disc of FIG. 3. This figure represents a view of printable area 104 as viewed from a second (e.g., BD) side of the disc, as indicated by 104', 106', 202', 204', and 206'. For example, this second side (e.g., BD side) may be the non-print side. In this particular example, ring 204' can include correctly visible text patterns to indicate playback orientation information (e.g., "BLU RAY THIS SIDE DOWN"). As also can be appreciated, content information related to the Blu-ray content can also be indicated in ring 204'. Ring 202' from the view of the BD side of the disc can appear as a solid ring (e.g., in color white) if the first printing includes a solid pattern printed in ring 202. Alternatively, ring 202' may show at least portions of reversed text patterns for the DVD related information printed in ring 202 during the second printing if the first printing does not include a solid pattern printed in ring 202.

Particular embodiments can thus take advantage of the inner hub or printable area of a dual-sided disc being substantially transparent. Printing can occur on only one side of this printable area. For example, any light color (e.g., white, cream, etc.) can be utilized in a first printing, while any dark color (e.g., gray, black, etc.) can be utilized in the second printing. The ink color used in the first and second printings may be any suitable different or contrasting color such that the second printing color can serve as a background for the reversed text/pattern left behind from the first printing. Both the first and second printings can occur on one side of the disc, such as a less critical side based on the data formats in a hybrid disc, or based on other considerations.

Figure 5:
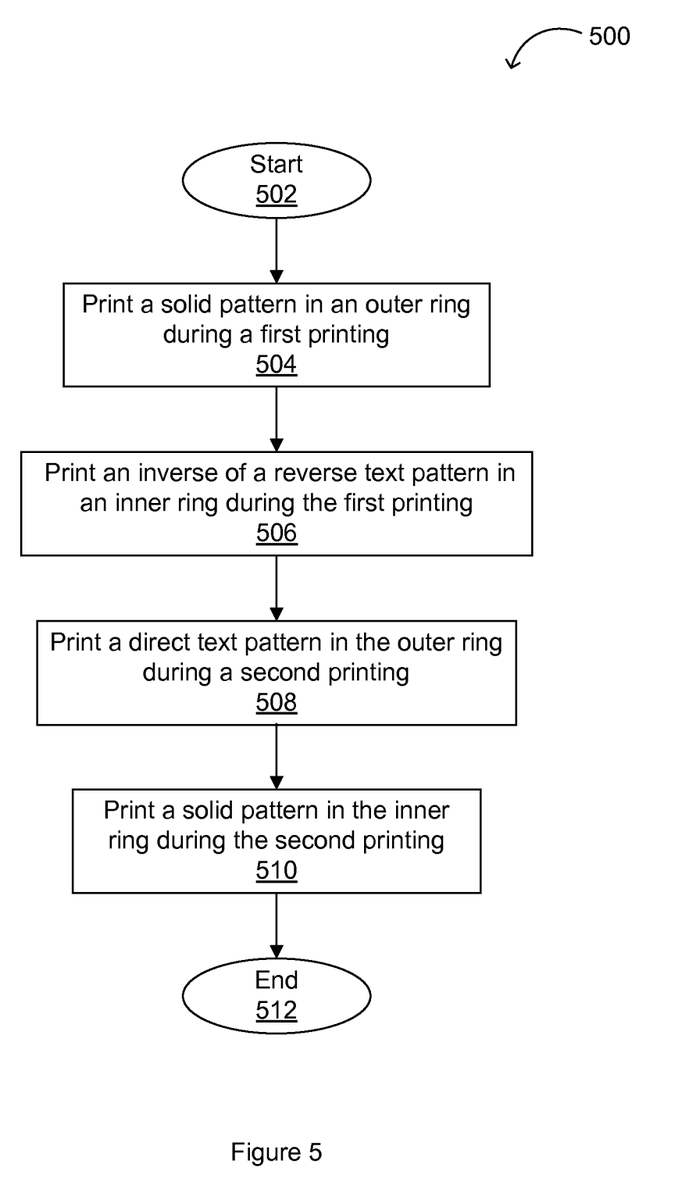
FIG. 5 is a flow diagram of an example method of printing information on a dual-sided disc.

In FIG. 5, shown is a flow diagram of an example method 500 of printing information on a dual-sided disc. As discussed above, an optical disc can include a first area 102 to store data for playback and that is reflective or opaque to visible light, and a second area 104 that is transparent to visible light and includes first and second concentric rings (e.g., 202 and 204) that are designated for printing. In certain embodiments, two printing steps can be performed on only one side of the optical disc.

The flow begins (502), and a solid pattern can be printed in an outer ring (e.g., 202) during a first printing (504). For example, the first printing can be done using one color (e.g., white), and a second printing can be done using a different color (e.g., black). Any suitable contrasting colors can be used for the two printing steps in particular embodiments. Further, this solid pattern printed in the outer ring can alternatively be left off in some applications, such as those where it is acceptable to have a clear background to the text subsequently printed in that outer ring.

An inverse of a reverse first text pattern may be printed in the first ring (e.g., 204) during the first printing on the first side (print side) of the optical disc (506). Thus, the first text pattern may be formed in reverse as viewed from the first side (e.g., the DVD side) of the optical disc. As discussed above, the inverse text pattern defines the letters or other characters therein by outlining each such character so that the characters themselves are transparent. These characters can remain transparent until the second printing, which may provide a background for this first text pattern by printing a contrasting colored solid pattern. In this fashion, the printed inverse of a reverse first text pattern may appear as a correctly visible text pattern from the non-print side of the optical disc. The color of the letters or characters in the first text pattern may then appear same as the background color printed in the second printing.

A second text pattern can be printed in the second ring (e.g., 202) during the second printing on the first side of the optical disc (508). The second text pattern may be directly printed (e.g. not an inverse text pattern) and correctly visible as viewed from the first side (e.g., DVD side) of the optical disc. Another solid pattern can be printed in the inner ring (e.g., 204) during the second printing on the first side of the optical disc (510), completing the flow (512). This solid pattern in the inner ring may overlay at least a portion of the first text pattern to provide the background for the first text pattern, as discussed above.

In this fashion, the first text pattern in the inner ring is correctly visible as viewed from the second side (e.g., BD side) of the optical disc, and the second text pattern in the outer ring is correctly visible as viewed from the first side (e.g., DVD side) of the optical disc. Further, letters in the correctly visible first text pattern have a same color (e.g., black) as that of the second text pattern and the solid pattern in the inner ring. Of course, either ring can contain the inverted text in reverse form, with the other ring having the direct or correctly visible text as viewed from the print side of the disc. Further, the text patterns can be printed in any part of the transparent area of the disc (e.g., any part of printable area 104, edge 108, etc.), and need not be constrained to an actual ring around the disc center.

Particular embodiments can also accommodate more than two printings. For example, three printing layers can be employed by making the second printing be a solid band of color in the designated rings (e.g., concentric rings 202 and 204). Thus, step 508 in the example flow above would instead be a solid pattern in the outer ring. In this case, steps 508 and 510 would form solid patterns in both inner ring 204 and outer ring 202. The third printing can then be printed on top of the second print layer. Thus, an additional step or steps can include third or subsequent printings of text that is correctly viewable or readable from the first or print side of the disc.

If three printings are performed, the colors of the characters as seen on one side of the disc can be different than the colors of the characters on the other side of the disc. For example, the first printing may be in a white color, the second printing may be in a black color, and the third printing may be in a red color. This particular example would provide black letters in the text pattern as viewed from the non-print side, and red letters in the text pattern as viewed from the print side. Of course, any suitable combinations of colors can be used for the print layers chosen. For example, the first and second printings may use contrasting colors, and the second and third printings may use contrasting colors, but the first and third printings may use a same color. Such three or more printings may be helpful in minimizing color variation that may appear when printing only one or two print layers on the optical disc.

Figure 7:
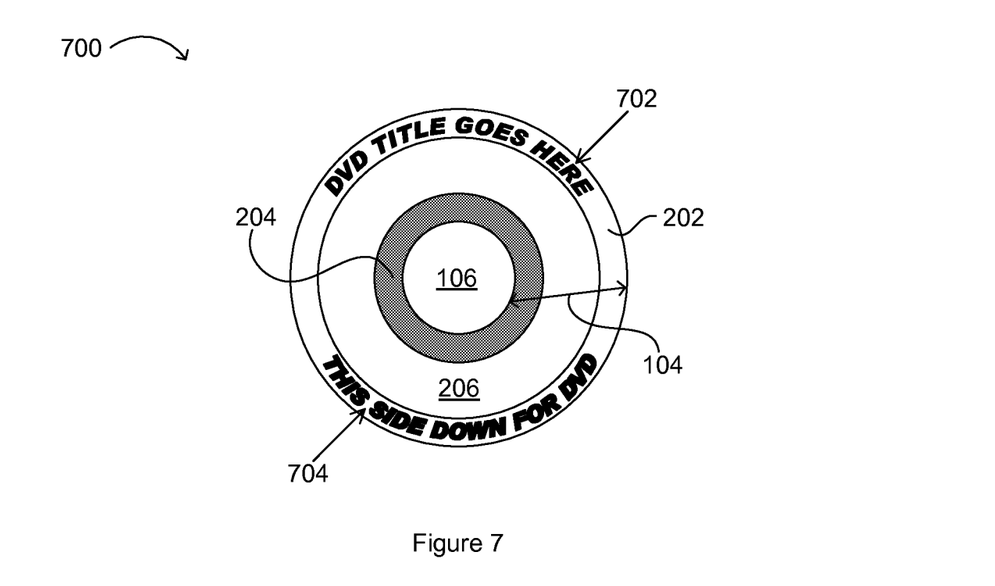
FIG. 7 depicts an example second printing on the DVD side of the example dual-sided disc of FIG. 6.

FIGS. 6 and 7 show example first and second printings for the example case of only two printing layers discussed herein. In FIG. 6, shown is an example 600 first printing on the DVD side of an example dual-sided disc. This figure represents text and other patterns as printed during a first printing step. For example, a white color can be used for the first printing step. In this particular example, an inverse of a first text pattern (e.g., "BLU RAY THIS SIDE DOWN") can be printed in reverse 602. Because an inverse of the first text pattern is printed, the actual letters in the first text pattern are transparent after the first printing and before the second printing. Once the second printing occurs, this forms a background and provides the color of the letters in the first text pattern as viewed from the non-print side of the disc. Any suitable alphanumeric characters, or other characters, etc., can be inversely printed in this reverse form. A solid pattern can also be printed in outer ring 202. For example, a solid white pattern can be printed in outer ring 202, and the inverse of the reversed first text pattern can also be printed in white in inner ring 204.

In FIG. 7, shown is an example 700 second printing on the DVD side of the example dual-sided disc of FIG. 6. This figure represents text and other patterns as printed during a second printing step. For example, a black color can be used for this second printing step. In this particular example, a solid pattern can be printed in inner ring 204. In addition, content information 702 (e.g., "DVD TITLE GOES HERE") and playback orientation information 704 (e.g., "THIS SIDE DOWN FOR DVD") can be printed in outer ring 202.

In certain embodiments, a same character or text pattern may not be viewable from each side of the disc. Rather, the DVD side content and playback orientation information (e.g., "DVD TITLE GOES HERE," "THIS SIDE DOWN FOR DVD," etc.) may only be viewable and correctly visible from the DVD side. This information can be effectively, or at least partially, blocked from view from the Blu-ray side by the solid pattern printed in outer ring 202 during the first printing. Alternatively, if there is no solid pattern (e.g., a solid white pattern) printed in outer ring 202, the DVD side content and playback orientation information may not be correctly readable as viewed from the Blu-ray side, but rather would be viewable in reverse from the side.

Also, the Blu-ray content and playback orientation information (e.g., "BLU RAY THIS SIDE DOWN," etc.) may only be viewable and correctly visible from the Blu-ray side because the solid layer printed in inner ring 204 during the second printing can block this text from view on the DVD side. In this fashion, unique text patterns can be provided to each side of the optical disc. Further, such unique text patterns can be placed in different locations (e.g., inner ring or outer ring) depending on which side of the optical disc is viewed, while performing the printing on only one side of the optical disc.

The patterns and ring allocations can also be varied in accordance with particular embodiments. For example, inverse reversed text that is correctly viewable or readable from the non-print side can be placed in outer ring 202 instead of inner ring 204. Similarly, the direct or correctly visible/readable text on the print side can be placed in inner ring 204 instead of outer ring 202. In addition, more than two rings may be allocated and/or more than two printing steps can also be accommodated in particular embodiments.

Although the description has been described with respect to particular embodiments thereof, these particular embodiments are merely illustrative, and not restrictive. For example, any type of disc or other item with a transparent portion can utilize particular embodiments. Techniques herein can be employed for any plastic or glass item to provide unique readability from two sides of the plastic/glass (e.g., a pill bottle, a liquid container, a sign, etc.). Along these lines, any shapes for areas (e.g., square, rectangle, etc.) allocated for printing can also be used in certain embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A dual-sided optical disc, comprising:
a first area for storing data for playback, wherein the first area is reflective or opaque to visible light; and
at least one second area that is transparent to visible light and having printed information therein, the printed information being on a first side of the optical disc, wherein the second area comprises:
a first ring having an inverse of a first text pattern, and a first solid pattern that overlays at least a portion of the first text pattern, wherein the first text pattern is correctly visible as viewed from a second side of the optical disc, wherein letters in the correctly visible first text pattern have a same color as the first solid pattern, and wherein the inverse of the first text pattern is in a first color, and the first solid pattern is in a second color; and
a second ring concentric with the first ring, wherein the second ring comprises a second text pattern that is correctly visible as viewed from the first side of the optical disc, wherein the second text pattern is in the second color.

2. The optical disc of claim 1, wherein the second ring further comprises a second solid pattern in the first color, and wherein at least a portion of the second text pattern overlays the second solid pattern.

3. The optical disc of claim 1, wherein:
the first color comprises white;
the second color comprises black; and
the same color comprises black.

4. The optical disc of claim 1, wherein the first side of the optical disc comprises a first media format, and the second side of the optical disc comprises a second media format.

5. The optical disc of claim 1, wherein the first ring is an inner ring, and the second ring is an outer ring.

\* \* \* \* \*